(12) United States Patent
Abdourazak et al.

(10) Patent No.: US 8,076,395 B2
(45) Date of Patent: Dec. 13, 2011

(54) LOW TEMPERATURE CURABLE EPOXY COMPOSITIONS CONTAINING UREA CURATIVES

(75) Inventors: Atteye Houssein Abdourazak, Allentown, PA (US); Gamini Ananda Vedage, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 75 days.

(21) Appl. No.: 12/557,824

(22) Filed: Sep. 11, 2009

(65) Prior Publication Data

US 2011/0065958 A1     Mar. 17, 2011

(51) Int. Cl.
*C08L 63/00* (2006.01)
*C08G 18/32* (2006.01)
*C08L 75/02* (2006.01)

(52) U.S. Cl. ............ 523/461; 528/61; 528/68; 525/528
(58) Field of Classification Search .................. 525/528; 528/44, 59, 61, 68, 69; 523/461
See application file for complete search history.

(56) References Cited

U.S. PATENT DOCUMENTS

| | | | |
|---|---|---|---|
| 3,386,955 A | 6/1968 | Nawakowski et al. | |
| 3,386,956 A | 6/1968 | Nawakowski et al. | |
| 3,759,915 A | 9/1973 | Kottke | |
| 3,789,071 A | 1/1974 | Babayan | |
| 3,956,237 A | 5/1976 | Doorakian et al. | |
| 4,094,827 A | 6/1978 | McEntire | |
| 4,273,686 A | 6/1981 | Noland et al. | |
| 4,645,818 A | 2/1987 | Andrews | |
| 5,719,320 A | 2/1998 | Jinbo | |
| 5,892,111 A | 4/1999 | Jinbo | |
| 6,423,756 B1 * | 7/2002 | Ghobary et al. | 521/128 |
| 7,910,667 B1 * | 3/2011 | Vedage et al. | 525/528 |

FOREIGN PATENT DOCUMENTS

| | | |
|---|---|---|
| DE | 3027796 A1 | 2/1982 |
| EP | 0304503 A1 | 1/1989 |
| EP | 0603131 A1 | 12/1992 |

* cited by examiner

*Primary Examiner* — Michael J Feely
(74) *Attorney, Agent, or Firm* — Michael K. Boyer; Jiyun Xu

(57) ABSTRACT

A heat curable epoxy composition comprising the contact product of an epoxy resin, an epoxy curing agent and an accelerator for the epoxy curing agent, the curing agent or the accelerator comprising a urea compound which is the reaction product of an isocyanate and an alkylated polyalkylenepolyamine having one primary or secondary amine and at least two tertiary amines of the general formula:

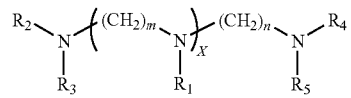

where $R_1$, $R_2$, $R_3$, $R_4$ and $R_5$ independently represent hydrogen, methyl or ethyl, n and m independently are integers from 1 to 6 and; X is an integer from 1 to 10.

22 Claims, No Drawings

LOW TEMPERATURE CURABLE EPOXY COMPOSITIONS CONTAINING UREA CURATIVES

BACKGROUND OF THE INVENTION

Epoxy based adhesives are used in various applications in automotive, electronics, aerospace and in the general industries. They are increasingly replacing conventional bonding systems such as soldering, welding, rivets, nails, screws and bolts because of the benefits they provide over these systems. Some of these benefits include bonding similar and dissimilar substrates without damaging them, better distribution of stress over wide area, better fatigue resistance and noise and vibration resistance.

A one-component epoxy based adhesive system is preferred over a two-components system because it eliminates the mixing step, the required time to apply it, the cooling during storage and shipping associated with the two-components system.

The present invention relates to latent curing agents and accelerators for epoxy resins including 100% solids epoxy compositions and water-based compositions, especially one-component 100% solids epoxy compositions. "Latent" curing agents are those curatives that in a formulated epoxy system remain inactive under normal ambient conditions but react readily with the epoxy resin at elevated temperatures. "Accelerators" are those materials that accelerate the reaction between the epoxy resin and the curing agent. "One component" epoxy compositions are typically a blend of an epoxy resin, a curing agent and optionally an accelerator as well as additives and fillers. "100% solids" means the epoxy composition contains no water or organic solvent.

BRIEF SUMMARY OF THE INVENTION

The present invention provides a urea compound composition that is the reaction product of an isocyanate and an alkylated polyalkylenepolyamine, especially a methylated polyalkylenepolyamine, and its use as a latent curing agent or as an accelerator for latent curing agents in heat curable one-component epoxy resin compositions. One-component epoxy resin compositions comprise the contact product of a latent curing agent, optionally but preferably an accelerator for the curing agent, and an epoxy resin.

In one aspect of the invention the latent curing agent, or the accelerator, is a urea compound which is the reaction product of an isocyanate and an alkylated polyalkylenepolyamine having at least one primary or secondary amine and at least two tertiary amines of the general formula:

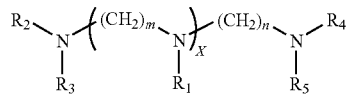

where $R_1$, $R_2$, $R_3$, $R_4$ and $R_5$ independently represent hydrogen, methyl or ethyl; n and m independently are integers from 1 to 6 and; X is an integer from 1 to 10. An aspect of the invention is the urea reaction product composition itself.

In another aspect of the invention the one-component epoxy resin composition comprises such urea compound as a curing agent, optionally an accelerator for the curing agent, and an epoxy resin. In another aspect of the invention the one-component epoxy resin composition comprises the contact product of dicyandiamide or an acid anhydride as a latent curing agent, such urea compound as an accelerator for the curing agent, and an epoxy resin.

In an aspect the invention is directed to such urea compounds as epoxy curing agents and their use in one-component heat curable epoxy compositions, such as 100% solids compositions and water-based compositions.

In yet another aspect the present invention is directed to such urea compounds as accelerators for latent curing agents, such as dicyandiamide or acid anhydride, and their use in one-component heat curable epoxy compositions, such as 100% solids compositions and water-based compositions.

Among the various aspects of the invention comprising such urea reaction product compositions are the following:

a curing agent for heat cured one-component epoxy compositions.

an accelerator for latent curing agents in heat cured one-component epoxy compositions.

one-component 100% solids epoxy compositions comprising a urea compound, a latent curing agent, such as dicyandiamide or acid anhydride, and an epoxy resin which offer low-temperature cure and shelf stability.

one-component water based epoxy compositions comprising a urea compound, a latent curing agent, such as dicyandiamide or acid anhydride, and an epoxy resin which offer low-temperature cure and shelf stability.

one-component 100% solids epoxy compositions comprising a urea compound as a latent curing agent, optionally an accelerator, and an epoxy resin which offer low-temperature cure and shelf stability.

one-component water based epoxy compositions comprising a urea compound as a latent curing agent, optionally an accelerator, and an epoxy resin which offer low-temperature cure and shelf stability.

Urea compounds, i.e., urea reaction product compositions, of the invention have been found to cure epoxy resin compositions at low temperature and can be used as the sole curing agent or as an accelerator for latent curing agents such as dicyandiamide (DICY) or acid anhydrides in one-component epoxy resin compositions.

Every aspect and every embodiment of the invention as disclosed herein is meant to be combined with all the other disclosed aspects and embodiments of the invention individually and in all possible combinations thereof.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. In addition, in contacting the components together two or more of the components may react to form other components.

DETAILED DESCRIPTION OF THE INVENTION

The invention relates to certain urea compounds and their use as curing agents or as accelerators for latent curing agents, such as dicyandiamide or acid anhydride, in curing epoxy resin compositions.

The latent curing agent, or accelerator, is a urea compound which is the reaction product of an isocyanate and an alkylated polyalkylenepolyamine having at least one primary or secondary amine and at least two tertiary amines of the general formula:

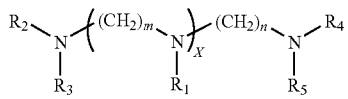

where $R_1$, $R_2$, $R_3$, $R_4$ and $R_5$ independently represent hydrogen, methyl or ethyl; n and m are independently integers from 1 to 6 and; X is an integer from 1 to 10. In a preferred aspect $R_1$ represents hydrogen or methyl; $R_2$ and $R_4$ represent methyl; $R_3$ and $R_5$ represent hydrogen or methyl, i.e., a methylated polyalkylenepolyamine.

For other aspects of each of the foregoing aspects and embodiments, the $R_1$-$R_5$ substituents are selected individually or in any combination provided the amine molecule has at least one primary or secondary amine and at least two tertiary amines.

Yet in other aspects of each of the foregoing aspects and embodiments, integers m, n and X are selected individually or in any combination of each other over the ranges stated above for each, with certain aspects of m and n being 2 or 3 and X being 1 to 7; m and n being 3 and X being 1; and m and n being 3 and X being 1-7.

Isocyanates useful for reacting with the polyalkylenepolyamine are any of the aliphatic isocyanates, cycloaliphatic isocyanates and aromatic isocyanates in which the isocyanate functionality —NCO is bonded directly to the aromatic ring. Suitable isocyanates include phenylisocyanate, toluene diisocyanate (TDI) including 2,4-TDI, 2,6-TDI and 2,4/2,6-TDI, methylene diphenyl diisocyanate (MDI) including its polymethylene polyphenylene poly(isocyanate) polymeric homologs, i.e., polymeric MDI.

Every aspect and every embodiment of the invention as disclosed herein is meant to be combined with all the other disclosed aspects and embodiments of the invention individually and in all possible combinations thereof.

The urea compounds of the invention can be prepared by reactions well known to a chemist and are reported in the literature such as in Jerry March, Advanced Organic Chemistry, Wiley-Interscience, Fourth Edition, page 1299. Basically, the isocyanate and the polyamine are reacted in a polyamine:isocyanate equivalents ratio of 1:1 for polyamines having one primary or secondary amine and isocyanates having one NCO group, 1:2 for polyamines having a total of two primary and/or secondary amines and isocyanates having one NCO group, 2:1 for polyamines having one primary or secondary amine and isocyanates having two NCO groups; optionally in a solvent such as toluene at elevated temperatures of 50-100° C. under an inert atmosphere at ambient pressure. In addition, the urea compounds are available commercially from Sigma Aldrich, Air Products and Chemicals, Inc., CVC Specialty Chemicals, and AlChem.

In an aspect of the invention suitable polyalkylenepolyamines for reacting with the isocyanate include 3,3'-iminobis(N,N-dimethylpropylamine), also known as N'-(3-dimethylaminopropyl)-N,N-dimethylpropane-1,3-diamine and available as Polycat® 15 catalyst from Air Products and Chemicals, Inc. and poly-N-methyl-azetidine, the preparation and structures of which are taught in U.S. 2008-0194776-A1 the disclosure of which is incorporated by reference herein. This aspect is meant to be combined with all other disclosed aspects and embodiments of the invention.

The urea compounds can be used as epoxy curing agents in one-component and two-component epoxy compositions such as adhesives, decorative and protective coatings including powder coatings, filament winding, printed circuit board and other epoxy applications. Typically, 0.5 to 10 parts by weight (pbw) urea compounds are used in the epoxy composition per 100 pbw epoxy resin, preferably 2 to 6 pbw of urea compounds.

The urea compounds can also be used as accelerators for curing agents, such as dicyandiamide and acid anhydrides like acetic anhydride, in one-component and two-component epoxy compositions such as adhesives, decorative and protective coatings including powder coatings, filament winding, printed circuit board and like epoxy applications. Typically, 0.5 to 10 parts by weight (pbw) curing agent are used in the epoxy composition per 100 pbw epoxy resin, preferably 2 to 6 pbw of curing agent, and 0.5 to 10 parts by weight (pbw) urea compounds are used as an accelerator in the epoxy composition per 100 pbw epoxy resin, preferably 2 to 6 pbw of urea compounds.

The urea compound as a curing agent or as an accelerator with the a curing agent is combined with an epoxy resin which is a polyepoxy compound containing more than one 1,2-epoxy groups per molecule. Such epoxides are well known in the epoxy art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 (Col 5/6 to 6/20), which is incorporated by reference. The preferred polyepoxy compounds are the diglycidyl ethers of bisphenol-A, the advanced diglycidyl ethers of bisphenol-A, the diglycidyl ethers of bisphenol-F, and the epoxy novolac resins. Both liquid epoxy resins and solid epoxy resins are suitably used in the one component epoxy compositions. Powder coating compositions would comprise a solid epoxy resin, a urea compound and dicyandiamide.

Epoxy compositions comprising urea compounds and epoxy resins can be formulated with a wide variety of ingredients well known to those skilled in the art of coating formulation, including solvents, fillers, pigments, pigment dispersing agents, rheology modifiers, thixotropes, flow and leveling aids, and defoamers.

While one component epoxy compositions comprising 1 to 90 wt % organic solvents, or 100 wt % solids epoxy compositions, or water-based, i.e., aqueous, epoxy compositions containing 20 to 80 wt % solids can be used, it is preferred the epoxy composition be 100 wt % solids.

The epoxy compositions of this invention can be applied as coatings by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

One component epoxy compositions of this invention can be cured at elevated temperatures ranging from about 80° C. to about 240° C., with cure temperatures of 120° C. to 160° C. preferred. Two component epoxy compositions of this invention can be cured at temperatures ranging from about 80° C. to about 240° C., with cure temperatures of 80° C. to 160° C. preferred.

Example A

Added 3,3'-iminobis(N,N-dimethylpropylamine) (28.1 g; 0.15 moles) into a 250 mL four-neck glass vessel equipped with an air driven mechanical stirrer, thermocouple, heating jacket with a water circulating bath and a nitrogen purge. The vessel was heated to 70-80° C. under nitrogen. Once the temperature stabilized, phenyl isocyanate (17.85 g; 0.15 moles) was added over one hour. The mixture was held at 70°

C. for one hour after the addition was completed, then cooled to ambient temperature to give a highly viscous product (45 g).

Example B

A mixture of 3,3'-iminobis(N,N-dimethylpropylamine) (6.3 g; 0.034 moles) and toluene (5 ml) were charged to a 250 mL four-neck glass vessel equipped with an air driven mechanical stirrer, thermocouple, heating jacket with a water circulating bath and a nitrogen purge. The vessel was heated to 70-80° C. under nitrogen. Once the temperature stabilized, 2,4/2,6-toluene diisocyanate (3 g; 0.017 mole) in toluene (5 mL) was metered in over 45-60 minutes. The mixture was held at 70° C. for one hour after the addition is complete. The temperature was lowered to 40° C. and the reactor crude liquid product is placed on a rotary evaporator to remove all of the toluene affording the product (9 g).

Example C

A mixture of 3,3'-iminobis(N,N-dimethylpropylamine) (63 g; 0.34 moles) and 50 ml of toluene were charged to a 500 mL four-neck glass vessel equipped with an air driven mechanical stirrer, thermocouple, heating jacket with a water circulating bath and a nitrogen purge. The vessel was heated to 70-75° C. under nitrogen. Once the temperature stabilized, polymeric methylene diphenyl diisocyanate (42.2 g; Equivalent weight of 135) in 50 mL of toluene was metered in over 45-60 minutes. The mixture was held at 70° C. for one hour after the addition was completed. The temperature was lowered to 40° C. and the reactor crude liquid product was placed on a rotary evaporator to remove all of the toluene. A yellow highly viscous product (103 g) was obtained.

Example D

A mixture of poly-(N-methyl-azetidine) (avg mol wt: 225 g; 10.5 g, 0.046 mole) and 10 ml of tetrahydrofuran were charged to a 250 mL three-neck glass vessel equipped with an air driven mechanical stirrer, thermocouple, and a nitrogen purge. The vessel was heated to 40° C. under nitrogen. Once the temperature stabilized, 2,4-toluene diisocyanate (9 g; 0.051 mole) was metered in over 45-60 minutes. The mixture was held at 70° C. for one hour after the addition was completed. Removal of the solvent under vacuum (13.1 mm Hg) at 150° C. gave a solid product (16.2 g)

The polyamine-isocyanate adducts of Examples A-D and several commercially available dimethylamine-based ureas were evaluated by differential scanning calorimeter (DSC) for their cure profile as epoxy curing agents. The epoxy formulation comprised polyglycidyl ether of Bisphenol A resin (Epon 828), 5 phr (wt parts per 100 parts resin) of the urea compound and 6 phr of dicyandiamide as the accelerator. The resulting mixtures were blended thoroughly for 2 minutes using a high sheer cowls blade mixer. Immediately after preparation the mixtures were examined by DSC to determine the onset temperature, the heat of reaction and the glass transition temperature (Tg). The DSC analysis was performed using a 10° C./min ramp heat rate on about a 10 to 15 mg sample of material. The resulting data is shown in Table 1.

The data shows that ureas obtained by reaction of methylated polyalkylenepolyamines having at least one primary or secondary amine and at least two tertiary amines with phenyl isocyanate, toluene diisocyanate and polymeric MDI provide low temperature of activation, good heat of reaction and high glass transition temperature.

TABLE 1

| Example | Onset Temp. (° C.) | Heat of reaction (J/g) | Tg (° C.) |
|---|---|---|---|
| N,N-Dimethyl, N'-3,4-dichlorophenyl-urea | 142 | 280 | 103 |
| 1,1-dimethyl-3-phenyl-urea | 141 | 278 | 98 |
| Example A | 92 | 399 | 116 |
| 3-[4-[[4 (dimethylcarbamoylamino) phenyl]methyl]phenyl]-1,1-dimethyl-urea | 135 | 367 | 113 |
| Example B | 90 | 379 | 119 |
| Example D | 112 | 383 | 126 |
| 3-[5-(dimethyl carbamoyl-amino)-2-methyl-phenyl]-1,1-dimethyl-urea | 142 | 371 | 118 |
| Example C | 93 | 365 | 125 |

We claim:

1. A urea compound which is the reaction product of an isocyanate and an alkylated polyalkylenepolyamine of the general formula:

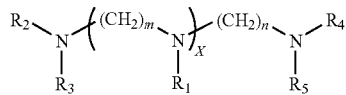

where $R_1$, $R_2$, $R_3$, $R_4$ and $R_5$ independently represent hydrogen, methyl or ethyl, provided that at least one of $R_2$, $R_3$, $R_4$ and $R_5$ is hydrogen and the alkylated polyalkylenepolyamine has at least one primary or secondary amine and at least two tertiary amines, n and m independently are integers from 1 to 6 and; and X is an integer from 1 to 10.

2. The urea compound of claim 1 in which $R_1$ represents hydrogen or methyl; $R_2$ and $R_4$ represent methyl; and $R_3$ and $R_5$ independently represent hydrogen or methyl, provided that at least one of $R_3$ and $R_5$ is hydrogen and the alkylated polyalkylenepolyamine has at least one primary or secondary amine and at least two tertiary amines.

3. A heat curable epoxy composition comprising the contact product of an epoxy resin, an epoxy curing agent and an accelerator for the epoxy curing agent, the accelerator comprising a urea compound which is the reaction product of an isocyanate and an alkylated polyalkylenepolyamine of the general formula:

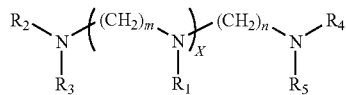

where $R_1$, $R_2$, $R_3$, $R_4$ and $R_5$ independently represent hydrogen, methyl or ethyl, provided that the alkylated polyalkylenepolyamine has at least one primary or secondary amine and at least two tertiary amines; n and m independently are integers from 1 to 6 and; and X is an integer from 1 to 10.

4. The epoxy composition of claim 3 in which $R_1$ represents hydrogen or methyl; $R_2$ and $R_4$ represent methyl; and $R_3$ and $R_5$ independently represent hydrogen or methyl, provided that the alkylated polyalkylenepolyamine has at least one primary or secondary amine and at least two tertiary amines.

5. The epoxy composition of claim 3 in which n and m are independently 2 or 3.

6. The epoxy composition of claim 3 in which X is 1 to 7.

7. The epoxy composition of claim 3 in which the polyamine is 3,3'-iminobis(N,N-dimethylpropylamine) or poly-(N-methyl-azetidine).

8. The epoxy composition of claim 3 in which the isocyanate is selected from phenylisocyanate, toluene diisocyanate (TDI), methylene diphenyl diisocyanate (MDI) and polymeric MDI.

9. The epoxy composition of claim 3 in which the curing agent is dicyandiamide or an acid anhydride.

10. The epoxy composition of claim 3 which is a 100% solids epoxy composition.

11. The epoxy composition of claim 3 which is an aqueous solids epoxy composition of 20 to 80 wt % solids.

12. The epoxy composition of claim 3 in which the epoxy resin is a diglycidyl ether of bisphenol-A, an advanced diglycidyl ether of bisphenol-A, a diglycidyl ether of bisphenol-F, or an epoxy novolac resin.

13. A heat curable epoxy composition comprising the contact product of an epoxy resin, an epoxy curing agent and optionally an accelerator for the epoxy curing agent, the curing agent comprising a urea compound which is the reaction product of an isocyanate and an alkylated polyalkylenepolyamine of the general formula:

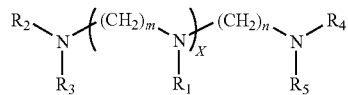

where $R_1$, $R_2$, $R_3$, $R_4$ and $R_5$ independently represent hydrogen, methyl or ethyl, provided that the alkylated polyalkylenepolyamine has at least one primary or secondary amine and at least two tertiary amines; n and m independently are integers from 1 to 6 and; and X is an integer from 1 to 10.

14. The epoxy composition of claim 13 in which $R_1$ represents hydrogen or methyl; $R_2$ and $R_4$ represent methyl; and $R_3$ and $R_5$ independently represent hydrogen or methyl, provided that the alkylated polyalkylenepolyamine has at least one primary or secondary amine and at least two tertiary amines.

15. The epoxy composition of claim 13 in which n and m are independently 2 or 3.

16. The epoxy composition of claim 13 in which X is 1 to 7.

17. The epoxy composition of claim 13 in which the polyamine is 3,3'-iminobis(N,N-dimethylpropylamine).

18. The epoxy composition of claim 17 in which the isocyanate is selected from phenylisocyanate, toluene diisocyanate (TDI), methylene diphenyl diisocyanate (MDI) and polymeric MDI.

19. The epoxy composition of claim 13 in which the isocyanate is selected from phenylisocyanate, toluene diisocyanate (TDI), methylene diphenyl diisocyanate (MDI) and polymeric MDI.

20. The epoxy composition of claim 13 which is a 100% solids epoxy composition.

21. The epoxy composition of claim 13 which is an aqueous solids epoxy composition of 20 to 80 wt % solids.

22. The epoxy composition of claim 13 in which the epoxy resin is a diglycidyl ether of bisphenol-A, an advanced diglycidyl ether of bisphenol-A, a diglycidyl ether of bisphenol-F, or an epoxy novolac resin.

\* \* \* \* \*

UNITED STATES PATENT AND TRADEMARK OFFICE
CERTIFICATE OF CORRECTION

| | | |
|---|---|---|
| PATENT NO. | : 8,076,395 B2 | |
| APPLICATION NO. | : 12/557824 | |
| DATED | : December 13, 2011 | |
| INVENTOR(S) | : Atteye Houssein Abdourazak et al. | |

It is certified that error appears in the above-identified patent and that said Letters Patent is hereby corrected as shown below:

Column 6, Line 34

In claim 1 delete the word "and"

Column 6, Line 58

In claim 3 delete the word "and"

Column 8, Line 3

In claim 13 delete the word "and"

Signed and Sealed this
Third Day of July, 2012

David J. Kappos
*Director of the United States Patent and Trademark Office*